(12) United States Patent
Ramakrishnan (10) Patent No.: US 12,553,675 B2
(45) Date of Patent: Feb. 17, 2026

(54) DETECTION OF ABNORMAL HEAT EXCHANGER OPERATING CONDITION

(71) Applicant: Siemens Healthcare Diagnostics Inc., Tarrytown, NY (US)

(72) Inventor: Narayanan Ramakrishnan, New City, NY (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 110 days.

(21) Appl. No.: 18/579,489

(22) PCT Filed: Jul. 14, 2022

(86) PCT No.: PCT/US2022/073734
§ 371 (c)(1),
(2) Date: Jan. 15, 2024

(87) PCT Pub. No.: WO2023/288272
PCT Pub. Date: Jan. 19, 2023

(65) Prior Publication Data
US 2024/0318932 A1    Sep. 26, 2024

Related U.S. Application Data

(60) Provisional application No. 63/222,619, filed on Jul. 16, 2021.

(51) Int. Cl.
*F28D 7/00* (2006.01)
*F28F 27/00* (2006.01)

(52) U.S. Cl.
CPC .................... *F28F 27/00* (2013.01)

(58) Field of Classification Search
CPC ...................................... F28F 27/00
USPC ............................................ 165/200
See application file for complete search history.

(56) References Cited

U.S. PATENT DOCUMENTS

| | | | |
|---|---|---|---|
| 6,026,891 | A | 2/2000 | Fujiyoshi et al. |
| 2005/0104584 | A1 | 5/2005 | Kwun et al. |
| 2008/0082304 | A1 | 4/2008 | Miller |
| 2009/0138222 | A1 | 5/2009 | Kinomura et al. |
| 2012/0256419 | A1 | 10/2012 | Kaiser |
| 2013/0118706 | A1 | 5/2013 | Kareh et al. |
| 2015/0346156 | A1 | 12/2015 | Paul |
| 2017/0336091 | A1 | 11/2017 | Arensmeier et al. |

(Continued)

FOREIGN PATENT DOCUMENTS

| | | |
|---|---|---|
| JP | 2008-197960 A | 8/2008 |
| KR | 10-2073925 B1 | 2/2020 |
| WO | 2021/024521 A1 | 2/2021 |

OTHER PUBLICATIONS

Extended EP Search Report dated Oct. 9, 2024 of corresponding European Application No. 22843050.0, 4 Pages.

(Continued)

*Primary Examiner* — Davis D Hwu (57) ABSTRACT

A method for detecting an abnormal operating condition of a heat exchanger is provided. The method includes determining the actual current through a heat exchanger, using the actual current to indicate an abnormal operating condition, and declaring a fault state. A step of comparing the baseline current to the actual current includes normalizing the actual current, calculating a difference between the normalized actual current and the baseline current, and determining that difference is less than zero.

17 Claims, 8 Drawing Sheets

(56) References Cited

U.S. PATENT DOCUMENTS

| | | |
|---|---|---|
| 2019/0101342 A1 | 4/2019 | Victor et al. |
| 2020/0232981 A1 | 7/2020 | Johnson et al. |
| 2020/0366078 A1 | 11/2020 | Telefus et al. |
| 2021/0140695 A1 | 5/2021 | Terzic et al. |

OTHER PUBLICATIONS

PCT International Search Report and Written Opinion dated Sep. 19, 2022 (10 Pages).

DETECTION OF ABNORMAL HEAT EXCHANGER OPERATING CONDITION

CROSS REFERENCE TO RELATED APPLICATION

This application claims the benefit of U.S. Provisional Patent Application No. 63/222,619, entitled "DETECTION OF ABNORMAL HEAT EXCHANGER OPERATING CONDITION" filed Jul. 16, 2021, the disclosure of which is hereby incorporated by reference in its entirety for all purposes.

TECHNICAL FIELD

The subject matter described herein relates generally to a method of detecting abnormal heat exchanger operating conditions, and, more particularly, to a method of detecting a fault state of a wash heater.

BACKGROUND

In an in vitro diagnostic medical device (IVD) environment, probes are cleaned with wash fluid warmed to a desired temperature by a wash heater. The heater is primed by a vacuum pump that draws fluid from a reservoir into the heater. When fully and properly primed, few or no air bubbles exist in the fluid, and a thermistor at the heater's outlet can accurately sense the temperature of the fluid.

There are many reasons a heater may not be properly primed. It may have been improperly primed, or it may not have been primed at all. It could have been properly primed but lost its priming due to leaks or other factors.

Regardless of the cause, air bubbles or air pockets will exist in the fluid of an improperly primed heater. The presence of these air bubbles and air pockets causes two things to happen. One, heat transfer between the heating element of the heat exchanger and the fluid is reduced. Two, the thermistor cannot accurately sense the temperature of the fluid—it reads a temperature that is lower than the actual temperature. In response, the system keeps operating to raise the temperature of the fluid. As a result, the heater will begin to overheat, eventually causing damage to the heater.

It would be desirable to be able to detect that a heater is improperly primed before it begins to overheat. This could be accomplished by adding pressure sensors to the heater to detect abnormal flow, but it would be preferable if detection could occur using only existing equipment. Ideally, it would be easily implemented on existing software and hardware architecture.

An ideal detection system would be sensitive and accurate. It would also be immediate, so that the heater can be shut off before it is damaged. An ideal detection system would also allow for in-situ monitoring. Further, it would indicate not only that a fault state was occurring, but would indicate the type of fault state.

SUMMARY

In some embodiments, a method for detecting an abnormal operating condition of a heat exchanger is provided. In some embodiments, the method includes determining the actual current through a heat exchanger, using the actual current to indicate an abnormal operating condition, and declaring a fault state.

In other embodiments, the method further includes determining a baseline current. In some embodiments, the step of using the actual current to indicate an abnormal operating condition includes comparing the baseline current to the actual current.

In other embodiments, the step of determining a baseline current includes operating a heat exchanger under baseline conditions and measuring a current through the heat exchanger. In some embodiments, the current through the heat exchanger operating under baseline conditions is the baseline current.

In other embodiments, the baseline conditions are a fully primed heat exchanger running from cold start under worst-case conditions and maximum duty load.

In other embodiments, the step of comparing the baseline current to the actual current includes normalizing the actual current, calculating a difference between the normalized actual current and the baseline current, and determining that difference is less than zero. In some embodiments, the step further includes determining a baseline signal-to-noise ratio, calculating an actual signal-to-noise ratio, comparing the actual signal-to-noise ratio to the baseline signal-to-noise ratio, and determining that the actual signal-to-noise ratio is greater than the baseline signal-to-noise ratio.

In other embodiments, the baseline conditions represent a particular type of abnormal operating condition. In some embodiments, the particular type of abnormal operating condition is declared.

In other embodiments, the one or more types of abnormal operating conditions is chosen from the group consisting of not primed, partially primed, and primed.

In some embodiments, the step of using the actual current to indicate an abnormal operating condition includes determining a baseline temperature and determining the heat exchanger's reference-temperature resistance and thermal coefficient of electrical resistance. In some embodiments, the step further includes calculating an actual temperature using the heat exchanger's reference-temperature resistance and thermal coefficient of electrical resistance and determining that the heat exchanger's actual temperature is greater than the baseline temperature.

In other embodiments, the baseline temperature represents a particular type of abnormal operating condition. In some embodiments, the particular type of abnormal operating condition is declared.

In other embodiments, the abnormal operating conditions are chosen from the group consisting of not primed, partially primed, and primed.

In other embodiments, the step of declaring a fault state includes displaying via a graphical interface a visual indication that a fault state is present.

In other embodiments, the method further includes automatically shutting off the heat exchanger.

In other embodiments, the method further includes shutting off equipment that rely on the heat exchanger to function properly.

In some embodiments, a system for detecting an abnormal operating condition of a heat exchanger is provided. In some embodiments, the system includes a heat exchanger, a drive circuit with a current measuring device, a processor, and a graphical display. In some embodiments, the drive circuit is configured to drive the heat exchanger. In some embodiments, the current measuring device is configured to measure the current through the drive circuit, and thus, through the heat exchanger. In some embodiments the processor is configured to operate a heat exchanger, determine an actual current through the heat exchanger, use the actual current to indicate an abnormal operating condition, and declare a fault state. In some embodiments, the graphical display is configured to display an indication that a fault state is declared.

In other embodiments, the current measuring device is a sense resistor.

In other embodiments, the processor is further configured to determine a baseline current. In some embodiments and the processor is further configured to, for the step of using the actual current to indicate an abnormal operating condition, compare the baseline current to the actual current.

In other embodiments, the processor is further configured to, for the step of using the actual current to indicate an abnormal operating condition, normalize the current; calculate a difference between the actual current and the baseline current; and determine that the difference is less than zero.

In other embodiments, the processor is further configured to, for the step of using the actual current to indicate an abnormal operating condition, determine a baseline temperature and determine the heat exchanger's reference-temperature resistance and thermal coefficient of electrical resistance. In some embodiments, the processor is further configured to calculate the heat exchanger's actual temperature using the actual current, the reference-temperature resistance, and the thermal coefficient of electrical resistance and determine that the actual temperature is greater than the baseline temperature.

In other embodiments, the processor is further configured to, for the step of determining the heat exchanger's reference-temperature resistance and thermal coefficient of electrical resistance, operate the heat exchanger under a plurality of duty conditions; measure a current and temperature for each of the duty conditions; and calculate the heat exchanger's reference-temperature resistance and thermal coefficient of electrical resistance using the measured currents and temperatures.

In some embodiments, a computer program configured to detect a fault state of a heat exchanger is provided. In some embodiments, the computer program comprises a computer readable storage medium having program instructions embodied therewith. In some embodiments, the program instructions executable by a processor cause to determine an actual current through the heat exchanger, use the actual current to indicate an abnormal operating condition, declare a fault state, and display an indication that a fault state is declared.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

The present disclosure describes a method for detecting an abnormal operating condition a heat exchanger, a system for detecting an abnormal operating condition of a heat exchanger, and a computer program product for detecting an abnormal operating condition of a heat exchanger.

Figure 1:
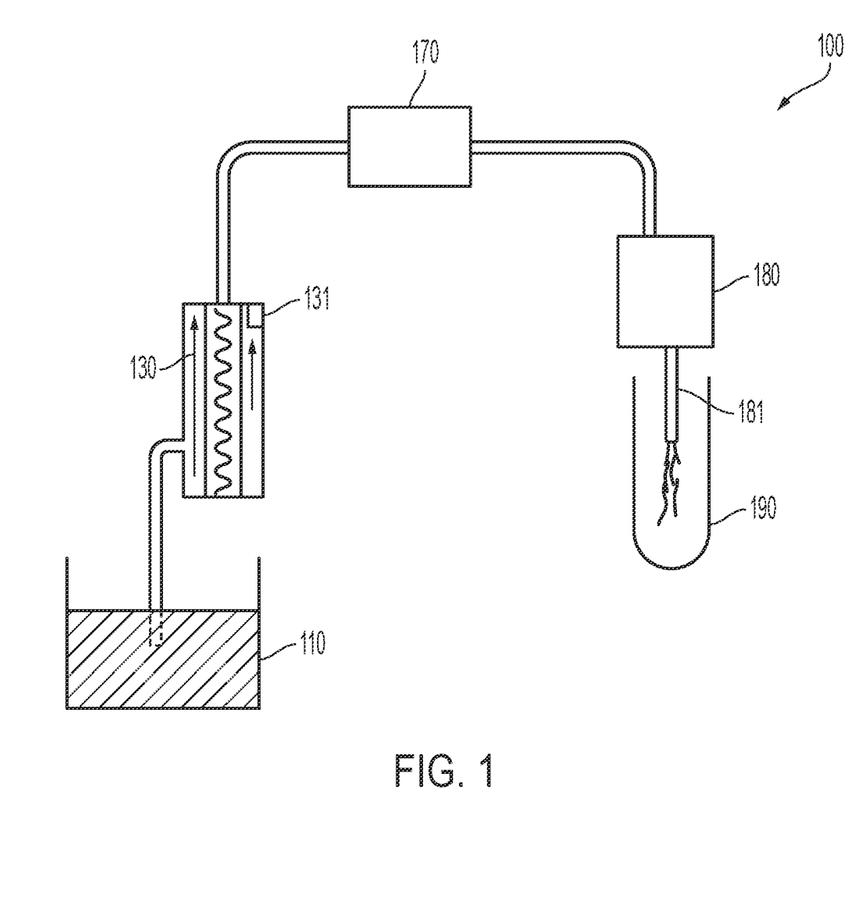
FIG. 1 is a diagram of an embodiment of a wash-heater circuit.

FIG. 1 is a diagram of an embodiment of a wash-heater circuit 100. Wash fluid is drawn from the wash fluid reservoir 110 into the wash heater 130 by the vacuum pump 170. Once the wash fluid reaches the desired temperature, it is sent to the wash probe dispense system 180. The wash fluid leaves the wash probe dispense system 180 through a wash probe 181 and into a cuvette 190. In this way, the cuvette 190 is washed with the warmed wash fluid.

As shown in FIG. 1, there is a thermistor 131 on the outlet of the wash heater 130. As discussed above, this thermistor 131 will read an artificially low temperature (i.e., the measured temperature is lower than the actual temperature) on an improperly primed wash heater 130.

Figure 2:
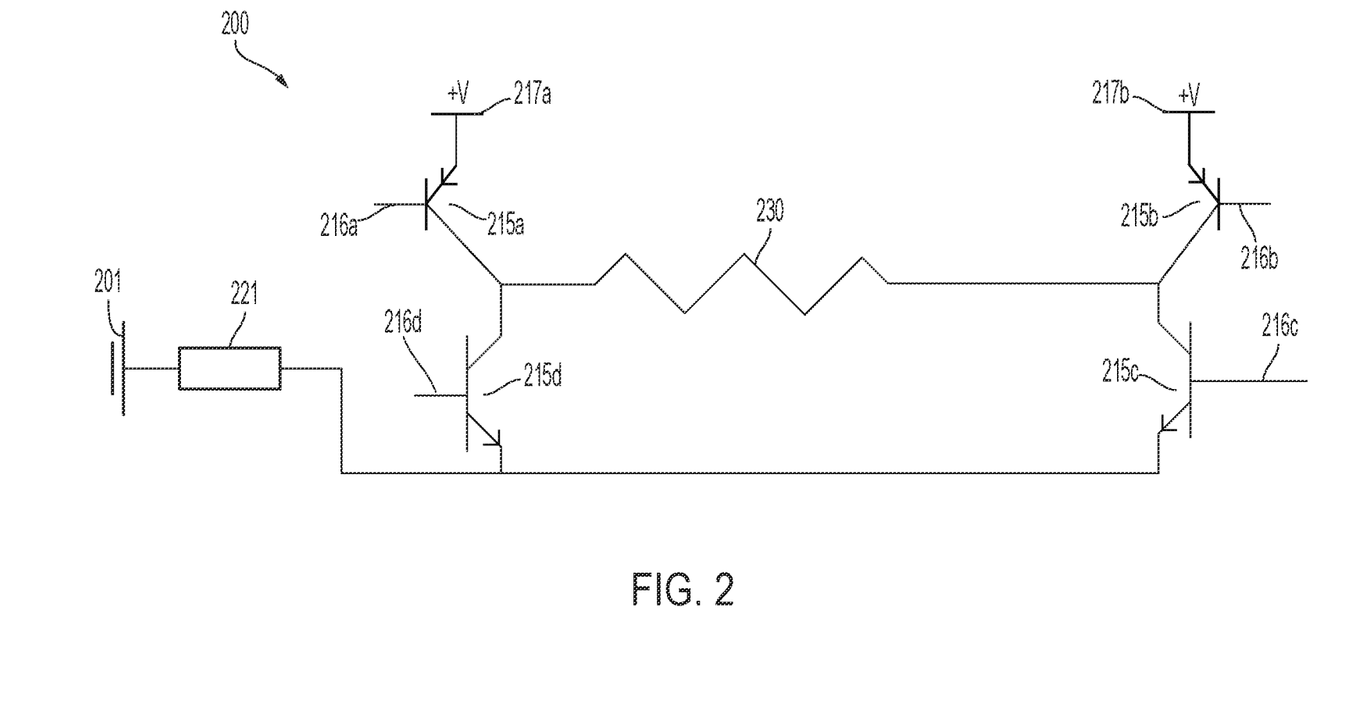
FIG. 2 is an example of drive circuit that drives a heat exchanger.

Heat exchangers can be powered by pulse width modulated ("PWM") drives. Often, these PWM-drives have sense resistors. For example, FIG. 2 is an example of drive circuit 200 that drives a heat exchanger 230. This example uses an H-bridge circuit. It contains four transistors 215a, 215b, 215c, and 215d. Each transistor has an associated base terminal (216a, 216b, 216c, 216d) to which the PWM control signals are applied based on the PWM control logic for the switching sequence, the rate of switching being determined by the duty-cycle computed by a controller. Positive potential is applied to transistors 215a and 215b at 217a and 217b. The circuit can be operated with transistors 215a and 215c on and transistors 215b and 215d off. The circuit can also be operated with transistors 230b and 230c off and transistors 230a and 230d on. The current through the circuit is measured by the sense resistor 221. The circuit ground is 201.

Figure 3:
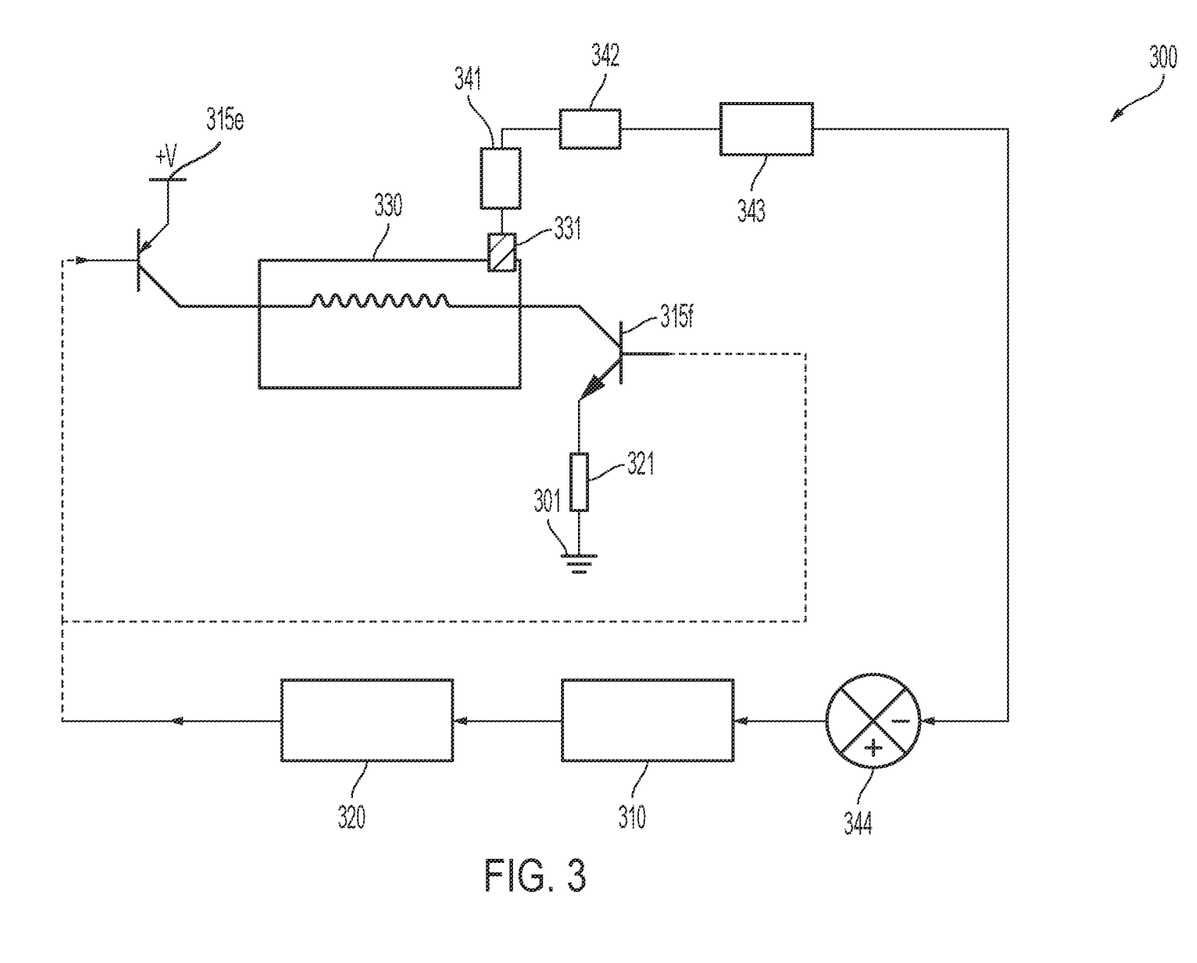
FIG. 3 is another example of a drive circuit that drives a heat exchanger.

FIG. 3 is another example of a drive circuit 300 that can drive a heat exchanger 330. In this embodiment, the drive circuit is a half H-bridge circuit to PWM-drive 320 to drive the heat exchanger. This circuit contains two transistors 315e and 315f. It also includes a thermistor 331 at the output of the heat exchanger 330, a signal conditioning element 341, an analog to digital converter 342, a digital low-pass filer 343, a heater reference temperature element 344, a controller 310, and a PWM-drive 320. In some embodiments, the controller 310 is a proportional-integral-derivative ("PID") controller. The current through the circuit is measured by the sense resistor 321.

The previous two examples provide examples of drive circuit that the heat exchanger can be driven by, but the subject matter herein is not limited by these two examples.

A fault condition may be detected by comparing an actual current to a baseline current. The resistance of a heat exchanger increases as its temperature increases. According to Ohm's Law, assuming a constant power source, when the resistance of a heat exchanger increases because it increases in temperature, the current through the heat exchanger will decrease. If the baseline current is known, an actual current less than the baseline current can indicate a fault condition of a heat exchanger.

In addition, a fault condition may be detected by comparing an actual temperature to a baseline temperature. Because the temperature of a heat exchanger will increase when it is improperly primed, the actual temperature of the heat exchanger may indicate a fault condition. As discussed above, thermistors at the outlet of a heat exchanger cannot provide an accurate temperature reading of a heat exchanger that is not properly primed. However, actual temperature may be calculated if the power and the current through the circuit are known.

The resistance of a heat exchanger is defined as:

$$R(T) = R_{Ref} \cdot (1 + \alpha \cdot [T_{Htr} - T_{Ref}])$$

where $R(T)$ is the resistance of the heat exchanger at a particular temperature, $R_{Ref}$ is a resistance at a reference point, $\alpha$ is the thermal coefficient of electrical resistance of the heat exchanger, $T_{Htr}$ is the actual temperature of the heat exchanger, and $T_{Ref}$ is the temperature of the heat exchanger at a reference point. This equation can be input into Ohm's Law and solved for the actual temperature of the heat exchanger:

$$V = I \cdot R$$

$$V = I \cdot R_{ref} \cdot (1 + \alpha \cdot [T_{Htr} - T_{Ref}])$$

$$T_{Htr} = \frac{\frac{\gamma \cdot V_{Ps}}{I_{Htr} \cdot R_{Ref}} - 1}{\alpha} + T_{Ref}$$

where $\gamma$ is the duty cycle, $V_{Ps}$ is the maximum power input to the heat exchanger, $I_{Htr}$ is the actual current, and $\alpha$ is the thermal coefficient of electrical resistance coefficient of the heat exchanger. If all of these values are known, the actual temperature of the heat exchanger can be calculated and compared to a baseline temperature.

The subject matter herein discloses practical applications of these phenomena.

Method of Detecting an Abnormal Operating Condition of Heat Exchanger

Some embodiments of the present disclosure are directed to a method of detecting a fault state of a heat exchanger using the actual current through the heat exchanger.

Figure 4:
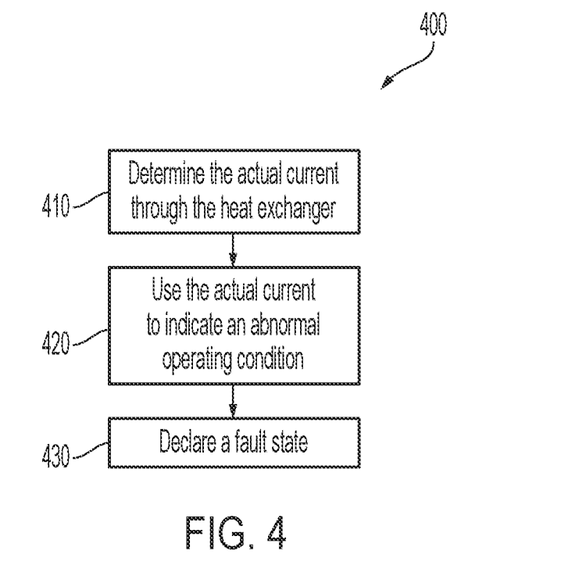
FIG. 4 is a diagram of an embodiment of a method of detecting an abnormal operating condition of a heat exchanger.

FIG. 4 is a diagram of an embodiment of a method of detecting an abnormal operating condition of a heat exchanger. In some embodiments, the method includes determining the actual current through the heat exchanger at step 410, using the actual current to indicate an abnormal operating condition at step 420, and declaring a fault state at step 430.

Method of Detecting an Abnormal Operating Condition of Heat Exchanger: Current Threshold Some embodiments of the present disclosure are directed to a method of detecting a fault state of a heat exchanger by comparing an actual current to a baseline current.

Figure 5:
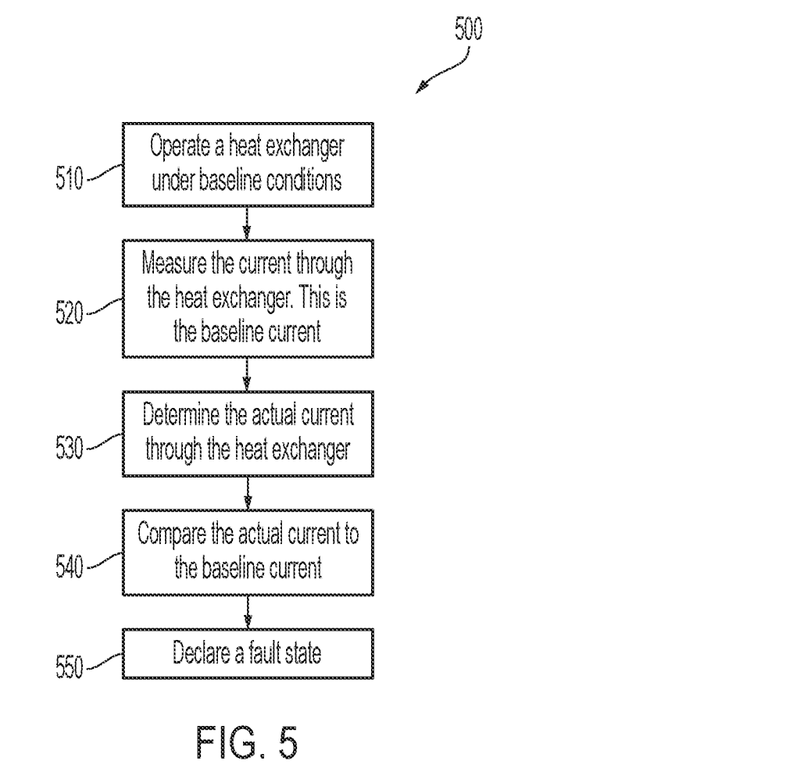
FIG. 5 is a diagram of an embodiment of a method of detecting an abnormal operating condition of a heat exchanger by comparing an actual current to a baseline current.

FIG. 5 is a diagram of an embodiment of a method of detecting an abnormal operating condition of a heat exchanger by comparing an actual current to a baseline current 500. In some embodiments, the method has calibration steps and detection steps. In some embodiments, the calibration includes operating the heat exchanger under baseline conditions at step 510 and measuring the current through a heat exchanger under those conditions to obtain the baseline current at step 520. In a preferred embodiment, the baseline conditions are a properly primed heat exchanger running from cold-start under worst-case conditions and maximum duty load. In some embodiments, this current represents the baseline current.

In some embodiments, the maximum duty cycle is the maximum temperature increase ("ramp-up") required considering the variation in heater element resistance, variations in power source voltage, variations in ambient environment temperature, and other uncertainties. In some embodiments, there variations are considered across multiple heat exchangers and the variation from heat exchanger to heat exchanger is also considered. The maximum allowable duty-cycle is typically pre-set. In some applications, the heat exchanger will be shut off if it stays at maximum duty-cycle for longer than a set period of time. In some embodiments the maximum duty cycle is the same as worst case conditions.

In some embodiments, the calibration step can be performed on multiple heat exchangers to calculate a baseline current based on the average currents of heat exchangers under baseline conditions.

In some embodiments, the detection steps include steps 530, 540, and 550. In some embodiments, the actual current through the heat exchanger is measured under actual operating conditions at step 530. In other embodiments, actual current is the average of actual current measured over a period of time or at several points in time.

In some embodiments, the actual current through the heat exchanger is compared to the baseline current in step 540. In some embodiments, comparing the actual current to the baseline current includes calculating the change between the baseline current and the actual current. In some embodiments, the equation is as follows:

$$\Delta I \triangleq \left(\frac{\gamma_{max}}{\gamma}\right) \cdot I_{Htr}(t_i) - \mu_{I_{Htr}}$$

where $\Delta I$ is the change in current, $\gamma_{max}$ is the maximum duty cycle, $\gamma$ is the actual duty cycle, $I_{Htr}(t_i)$ is actual current of the heat exchanger, and $\mu_{I_{Htr}}$ is the baseline current. Because the baseline current is taken under worst-case conditions, the actual current must be normalized to the actual duty cycle so that the system is able to properly declare a fault state. This can be done by multiplying the maximum duty load divided by the actual duty load, as shown in the equation above. If the change in current has a negative value, a signal-to-noise ratio can be calculated and compared to a signal-to-noise threshold. In some embodiments, the signal to noise ratio is calculated according to the following equation:

$$SNR = 20\log\left(\frac{|\Delta I|}{\sigma_{I_{Htr}}}\right)$$

where SNR is the actual signal-to-noise ratio, $\Delta I$ is the change in current, and $\sigma_{I_{Htr}}$ is the standard deviation of the currents measured during the calibration step. In some embodiments, if the signal-to-noise ratio is greater than the signal-to-noise threshold, a fault state is declared. In a preferred embodiment, the signal-to-noise threshold is 7 dB.

In the embodiments described above, a normalized actual current is compared to a baseline current to declare a fault state. However, this method can also be used to indicate the type of fault state, e.g., not primed, partially primed, or primed. In those embodiments, there is a baseline current associated with each fault state, e.g., a not primed baseline current, a partially primed baseline current, and a primed baseline current. The normalized actual current is compared to each of these baseline currents and a particular fault state can be declared. This allows for in-situ monitoring of the heat exchanger.

Once a fault state has been declared, some embodiments further include providing a visual or audio indication of a fault state. For example, in some embodiments, an alarm may sound. In some embodiments, a light will flash or turn amber. In other embodiments, the words "Fault State," or similar, will appear on a graphical user interface. In embodiments that indicate the type of fault state, the words "Not Primed," "Partially Primed," "Primed," or similar may appear on a graphical interface. In other embodiments, other indicators may be used to indicate the type of fault state. In some embodiments, upon indication of a fault state, the method will further include automatically shutting off the heat exchanger. In yet other embodiments, the method will further include sending a signal to equipment downstream. In some embodiments, the method will further include shutting off downstream equipment.

Method of Detecting an Abnormal Operating Condition of Heat Exchanger: Temperature Threshold Some embodiments of the present disclosure are directed to a method of detecting an abnormal operating condition of a heat exchanger by comparing a calculated actual temperature to a baseline temperature.

Figure 6:
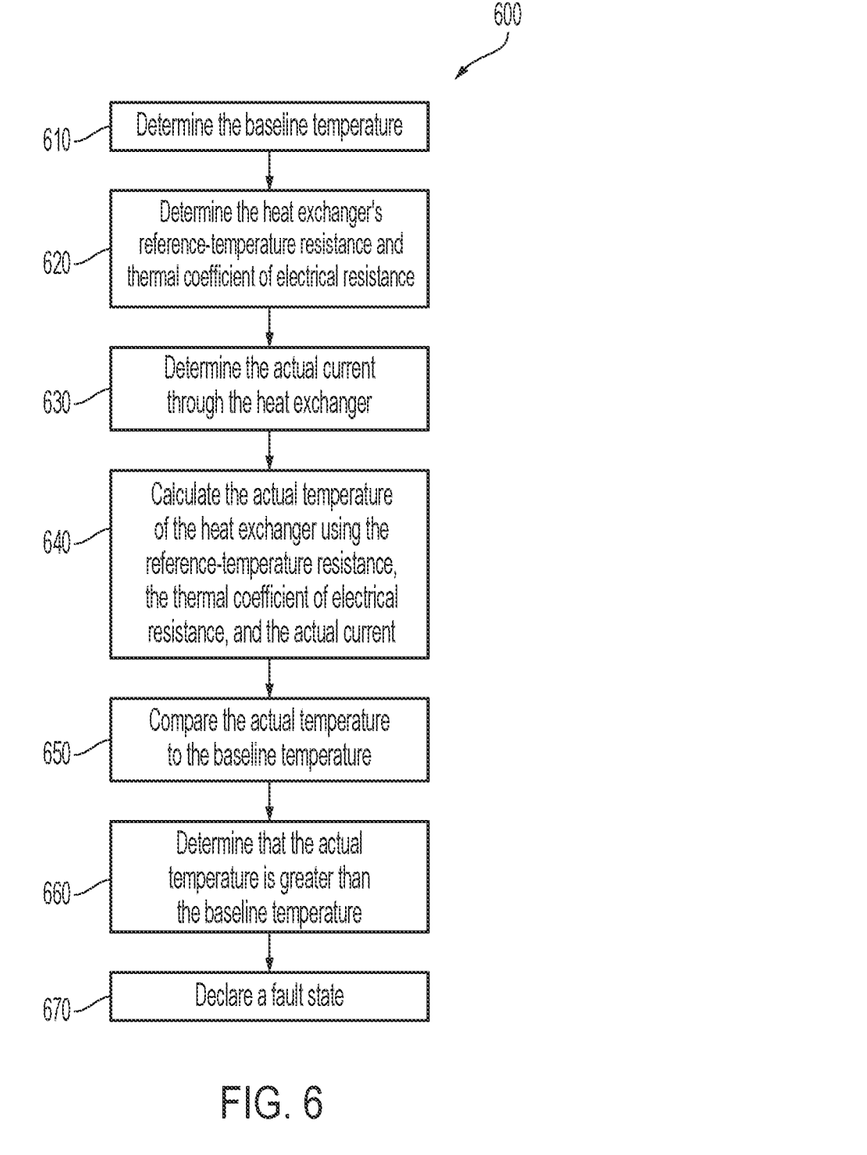
FIG. 6 is a diagram of an embodiment of a method of detecting an abnormal operating condition of a heat exchanger by comparing a calculated actual temperature to a baseline temperature.

FIG. 6 is a diagram of an embodiment of a method of detecting an abnormal operating condition of a heat exchanger by comparing a calculated actual temperature to a baseline temperature 600. In some embodiments, the method has calibration steps and detection steps. In some embodiments, the calibration step includes steps 610 and 620. In some embodiments, the calibration steps include determining a baseline temperature at step 610. In some embodiments, the calibration steps include determining the reference-temperature resistance and thermal coefficient of electrical resistance of the heat exchanger at step 620. A heat exchanger's reference-temperature resistance is the resistance of a heat exchanger at a reference temperature. In some embodiments, step 620 includes operating the heat exchanger under different duty cycle conditions, measuring the current and temperature of the heat exchanger under those different duty conditions, and, using those values, estimating the reference-temperature resistance and thermal coefficient of electrical resistance of the heat exchanger. In other embodiments, the reference-temperature resistance and the thermal coefficient of electrical resistance of the heat exchanger are known.

In some embodiments, the steps 610 and 620 can be performed on multiple heat exchangers to estimate the average reference-temperature resistance and thermal coefficient of electrical resistance of the heat exchangers.

In some embodiments, the detection steps include measuring the actual current through the heat exchanger under actual operating conditions at step 630. In other embodiments, actual current is the average of actual current measured over a period of time or at several points in time. In some embodiments, the actual current is used to calculate the actual temperature at step 640 according to the following equation:

$$T_{Htr} = \frac{\frac{\gamma \cdot V_{Ps}}{I_{Htr} \cdot R_{Ref}} - 1}{\alpha} + T_{Ref}$$

where $T_{Htr}$ is the actual temperature, $\gamma$ is the actual duty cycle, $V_{Ps}$ is the maximum power input to the heater, $I_{Htr}$ is the actual current, $R_{Ref}$ is the reference-temperature resistance of the heat exchanger, $\alpha$ is the thermal coefficient of electrical resistance of the heat exchanger, and $T_{Ref}$ is the temperature of the heat exchanger at a reference point. In some embodiments, the reference-temperature resistance and the thermal coefficient of electrical resistance of the heat exchanger estimated during the calibration step are used as $R_{Ref}$ and $\alpha$. In other embodiments, the reference-temperature resistance and the thermal coefficient of electrical resistance are known a priori and hence do not have to be inferred through a calibration process.

In some embodiments, the actual temperature is compared to a baseline temperature at step 650. In some embodiments, if the actual temperature exceeds the temperature threshold at step 660, a fault state is declared at step 670.

In the embodiments described above, a calculated actual temperature is compared to a baseline temperature to declare a fault state. However, this method can also be used to indicate the type of fault state, e.g., not primed, partially primed, or primed. In those embodiments, there is a baseline temperature associated with each fault state, e.g., a not primed baseline temperature, a partially primed baseline temperature, and a primed baseline temperature. The calculated actual temperature is compared to these baseline temperatures, and a particular fault state can be declared. This allows for in-situ monitoring of the heat exchanger.

Once a fault state has been declared, some embodiments further include providing a visual or audio indication of a fault state. For example, in some embodiments, an alarm may sound. In some embodiments, a light will flash or turn amber. In other embodiments, the words "Fault State," or similar, will appear on a graphical user interface. In embodiments that indicate the type of fault state, the words "Not Primed," "Partially Primed," "Primed," or similar may appear on a graphical interface. In other embodiments, other indicators may be used to indicate the type of fault state. In some embodiments, upon indication of a fault state, the method will further include automatically shutting off the heat exchanger. In yet other embodiments, the method will further include sending a signal to equipment downstream. In some embodiments, the method will further include shutting off downstream equipment.

Method of Detecting an Abnormal Operating Condition of Heat Exchanger: Current and Temperature Thresholds In some embodiments, both of these methods are used. In some embodiments, a fault state will be declared if a fault state is sensed on one method. In other embodiments, a fault state will be declared if a fault state is sensed on both methods.

System for Detecting an Abnormal Operating Condition of Heat Exchanger

Other embodiments of the present disclosure are directed to a system of detecting fault state of a heat exchanger. In some embodiments, the system comprises a heat exchanger, a drive circuit with a current measuring element, a processor, and a graphical display.

The heat exchanger is configured to heat up or cool down a fluid. The heat exchanger is not limited. For example, it can be any type of heater with a resistive heating element. In a preferred embodiment, the heat exchanger is a wash fluid heater configured to heat wash fluid. In other embodiments, the heat exchanger may be a Thermo-electric device using the Peltier effect to cool a fluid. In such an embodiment, the change in the required current with regard to baseline or the estimated change in the Peltier coefficient with regard to a pre-calibrated reference value can be used to detect an abnormal operating condition as described above.

The drive circuit is configured to drive the heat exchanger. While the drive circuit must include a current measuring element, it is otherwise not limited. In some embodiments, the drive circuit is supplied through a pair of switching transistors in an H-bridge circuit. In other embodiments, a full H-bridge circuit is used to drive two heat exchanger units independently at the same time.

In the preferred embodiment, the heat exchanger is driven using a PWM-drive consisting of a half H-bridge circuit. In some embodiments, the PWM control signals control the switching of the transistors, with the rate of switching being determined by the duty-cycle computed by a controller. In some embodiments, a comparator with other elements, like a saw-tooth input, can be used to generate a PWM output.

The drive circuit includes a current measuring element that measures the current through the circuit and thus, through the heat exchanger. The current measuring element is not limited. It can be anything that measures current. In a preferred embodiment, the current measuring element is a sense resistor.

As shown in FIG. 3, in some embodiments, the heat exchanger 330 is driven using a half H-bridge circuit to PWM-drive 320. The circuit 300 can connect to a +V terminal on one end and a ground 301 on the other. The circuit 300 can also include a pair of transistors 315e and 315f, a load between the transistors (the heat exchanger 330), and a sense resistor 321. In some embodiments, these elements are connected in series.

In some embodiments, a PWM-drive is not required. In some embodiments, one could use a non-PWM voltage control. In some embodiments, a non-PWM voltage control is a simple on/off or fuzzy control where the DC voltage source is just turned 'on' or 'off' by the controller depending on the error between the baseline and actual currents and temperatures.

In some embodiments, the processor is configured to implement the methods described herein.

Some embodiments further include a graphical display. In some embodiments, upon detecting a fault state of the heat exchanger, the graphical display may display to the user an alert indicating that a fault state is declared. In some embodiments, the screen will display the words "Fault State."

Figure 7:
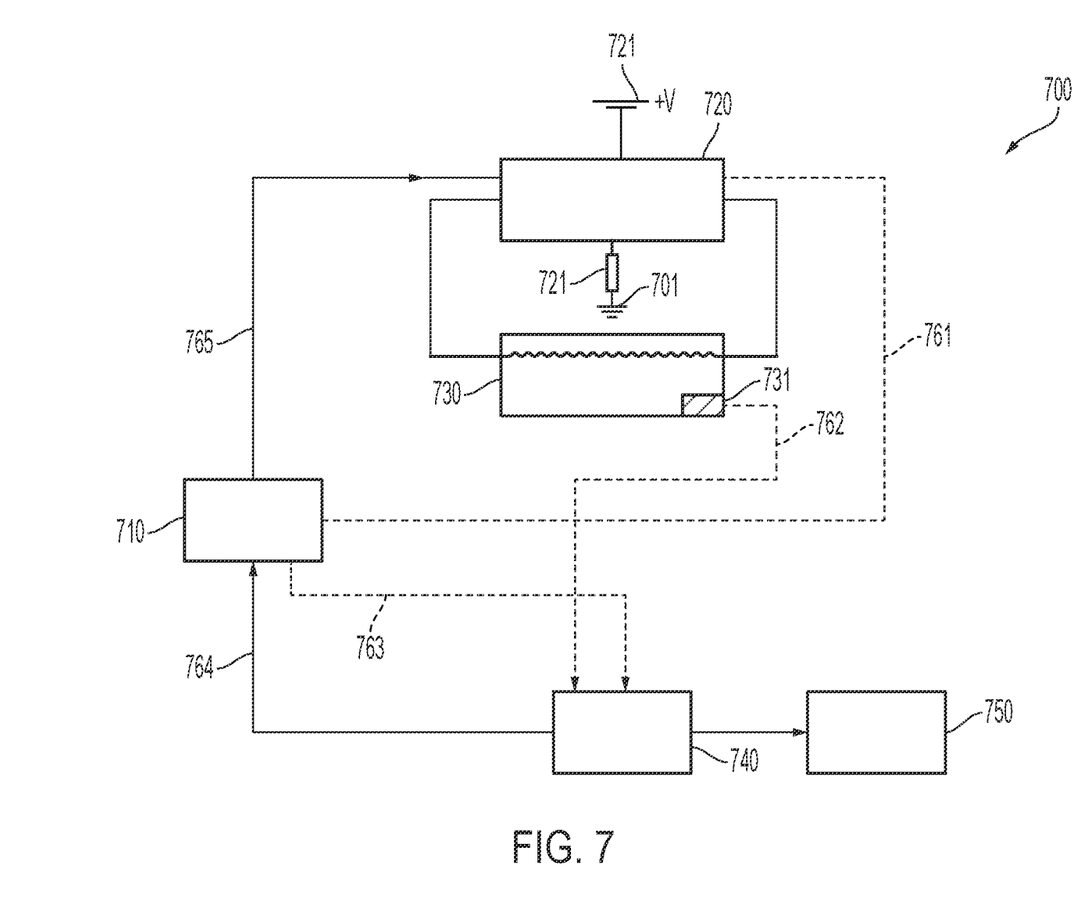
FIG. 7 is an embodiment of a system for detecting a fault state of a heat exchanger.

FIG. 7 is an embodiment of a system for detecting a fault state of a heat exchanger 700. In this embodiment, the heat exchanger 730 has a temperature sensor 731 located at its outlet configured to communicate to the processor 740 the actual temperature of fluid leaving the heat exchanger 730, as shown by line 762. The processor 740 is configured to communicate this information to the control system 710, which, based on that information, will determine the current command 765 to send to the PWM drive 720 to drive the heat exchanger 730. The processor 740 is also configured to communicate a set point temperature to the control system 710, as shown by line 764.

In this embodiment, the PWM-drive 720 driving the heat exchanger 730 has a sense resistor 721. The sense resistor 721 senses the current through the PWM-drive 720 (and thus, through the heat exchanger 730) and is configured to communicate that information to the control system 710, as shown by line 761. The control system then communicates that information to the processor 740, as shown by line 763. The processor 740 uses that information to determine if a fault state should be declared, according to the methods described above. Upon declaration of a fault state, the processor 740 is configured to communicate with the graphical display 750 to cause an indication that a fault condition is present.

Computer Program Product

Other embodiments of the present disclosure are directed to a computer program product for detecting a fault state of a heat exchanger. In some embodiments, the computer program product comprises a computer readable storage medium having program instructions embodied therewith to cause the processor to execute the methods described herein.

Figure 8:
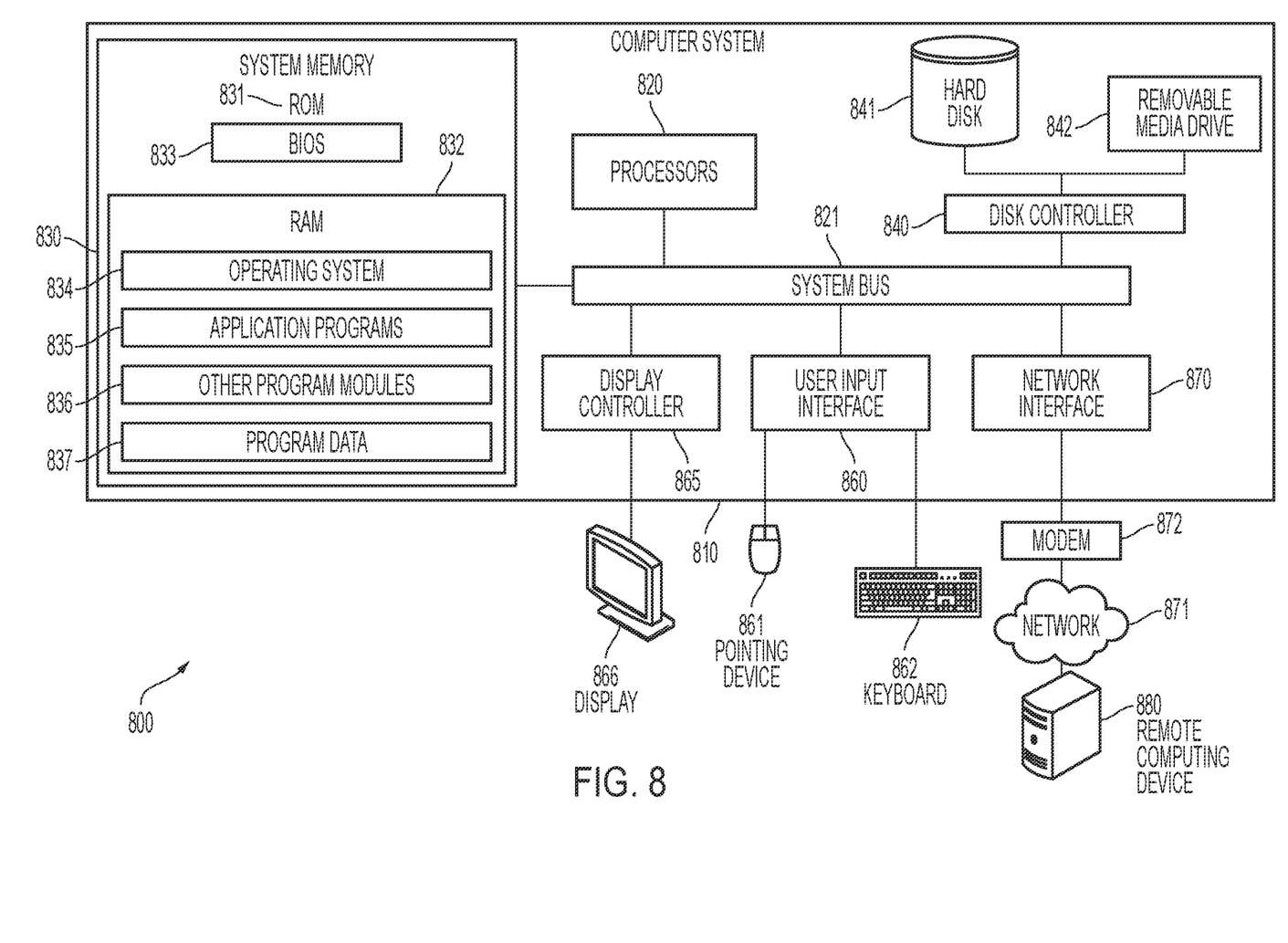
FIG. 8 illustrates an exemplary computing environment within which embodiments of the invention may be implemented.

FIG. 8 illustrates an exemplary computing environment 800 within which embodiments of the invention may be implemented. Computing environment 800 may include computer system 810, which is one example of a computing system upon which embodiments of the invention may be implemented. Computers and computing environments, such as computer system 810 and computing environment 800, are known to those of skill in the art and thus are described briefly here.

As shown in FIG. 8, the computer system 810 may include a communication mechanism such as a bus 821 or other communication mechanism for communicating information within the computer system 810. The system computer 810 further includes one or more processors 820 coupled with the system bus 821 for processing the information. The processors 820 may include one or more central processing units (CPUs), graphical processing units (GPUs), or any other processor known in the art.

The computer system 810 also includes a system memory 830 coupled to the bus 821 for storing information and instructions to be executed by processors 820. The system memory 830 may include computer readable storage media in the form of volatile and/or nonvolatile memory, such as read only memory (ROM) 831 and/or random access memory (RAM) 832. The system memory RAM 832 may include other dynamic storage device(s) (e.g., dynamic RAM, static RAM, and synchronous DRAM). The system memory ROM 831 may include other static storage device(s) (e.g., programmable ROM, erasable PROM, and electrically erasable PROM). In addition, the system memory 830 may be used for storing temporary variables or other intermediate information during the execution of instructions by the processors 820. A basic input/output system 833 (BIOS) containing the basic routines that help to transfer information between elements within computer system 810, such as during start-up, may be stored in ROM 831. RAM 832 may contain data and/or program modules that are immediately accessible to and/or presently being operated on by the processors 820. System memory 830 may additionally include, for example, operating system 834, application programs 835, other program modules 836 and program data 837.

The computer system 810 also includes a disk controller 840 coupled to the bus 821 to control one or more storage devices for storing information and instructions, such as a magnetic hard disk 841 and a removable media drive 842 (e.g., floppy disk drive, compact disc drive, tape drive, and/or solid state drive). The storage devices may be added to the computer system 810 using an appropriate device interface (e.g., a small computer system interface (SCSI), integrated device electronics (IDE), Universal Serial Bus (USB), or FireWire).

The computer system 810 may also include a display controller 865 coupled to the system bus 821 to control a display or monitor 866, such as a cathode ray tube (CRT) or liquid crystal display (LCD), for displaying information to a computer user. The computer system 810 includes a user input interface 860 and one or more input devices, such as a keyboard 862 and a pointing device 861, for interacting with a computer user and providing information to the processors 820. The pointing device 861, for example, may be a mouse, a trackball, or a pointing stick for communicating direction information and command selections to the processors 820 and for controlling cursor movement on the display 866. The display 866 may provide a touch screen interface which allows input to supplement or replace the communication of direction information and command selections by the pointing device 861.

The computer system 810 may perform a portion or all of the processing steps of embodiments of the invention in response to the processors 820 executing one or more sequences of one or more instructions contained in a memory, such as the system memory 830. Such instructions may be read into the system memory 830 from another computer readable medium, such as a hard disk 841 or a removable media drive 842. The hard disk 841 may contain one or more datastores and data files used by embodiments of the present invention. Datastore contents and data files may be encrypted to improve security. The processors 820 may also be employed in a multi-processing arrangement to execute the one or more sequences of instructions contained in system memory 830. In alternative embodiments, hard-wired circuitry may be used in place of or in combination with software instructions. Thus, embodiments are not limited to any specific combination of hardware circuitry and software.

As stated above, the computer system 810 may include at least one computer readable medium or memory for holding instructions programmed according to embodiments provided herein and for containing data structures, tables, records, or other data described herein. The term "computer readable medium" as used herein refers to any medium that participates in providing instructions to the processors 820 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 841 or removable media drive 842. Non-limiting examples of volatile media include dynamic memory, such as system memory 830. Non-limiting examples of transmission media include coaxial cables, copper wire, and fiber optics, including the wires that make up the bus 821. Transmission media may also take the form of acoustic or light waves, such as those generated during radio wave and infrared data communications.

The computing environment 800 may further include the computer system 810 operating in a networked environment using logical connections to one or more remote computers, such as a remote computing device 880. Remote computing device 880 may be a personal computer (laptop or desktop), a mobile device, a server, a router, a network PC, a peer device or other common network node, and typically includes many or all of the elements described above relative to computer system 810. When used in a networking environment, computer system 810 may include modem 872 for establishing communications over a network 871, such as the Internet. Modem 872 may be connected to system bus 821 via user network interface 870, or via another appropriate mechanism.

Network 871 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 810 and other computers (e.g., remote computing device 880). The network 871 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 871.

As described herein, the various systems, subsystems, agents, managers and processes can be implemented using hardware components, software components and/or combinations thereof.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

I claim:

1. A method for detecting an abnormal operating condition of a heat exchanger, the method comprising:
   determining an actual current through the heat exchanger;
   normalizing the actual current;
   determining a baseline current;
   comparing the baseline current to the actual current;
   determining that the normalized actual current is less than the baseline current;
   determining a baseline signal-to-noise ratio;
   calculating an actual signal-to-noise ratio;
   comparing the actual signal-to-noise ratio to the baseline signal-to-noise ratio;

determining that the actual signal-to-noise ratio is greater than the baseline signal-to-noise ratio; and
declaring a fault state.

2. The method of claim 1, wherein the step of determining a baseline current comprises:
operating the heat exchanger under baseline conditions; and
measuring a current through the heat exchanger, wherein the current through the heat exchanger is the baseline current.

3. The method of claim 2, wherein the baseline conditions are a fully primed heat exchanger running from cold start under maximum duty load.

4. The method of claim 2, wherein the baseline conditions represent a particular type of abnormal operating condition and wherein the declaring a fault state further comprises declaring the particular type of abnormal operating condition.

5. The method of claim 4, wherein the one or more types of abnormal operating conditions is chosen from the group consisting of not primed, partially primed, and primed.

6. A method for detecting an abnormal operating condition of a heat exchanger, the method comprising:
determining an actual current through the heat exchanger;
determining a baseline temperature;
determining a reference-temperature resistance of the heat exchanger and a thermal coefficient of electrical resistance of the heat exchanger;
calculating an actual temperature of the heat exchanger using the actual current, the reference-temperature resistance of the heat exchanger, and the thermal coefficient of electrical resistance of the heat exchanger for the step of using the actual current to indicate an abnormal operating condition comprises;
determining that the actual temperature of the heat exchanger is greater than the baseline temperature; and
declaring a fault state.

7. The method of claim 6, wherein the baseline temperature represents a particular type of abnormal operating condition and wherein the declaring a fault state further comprises declaring the particular type of abnormal operating condition.

8. The method of claim 7, wherein the type of abnormal operating condition is chosen from the group consisting of not primed, partially primed, and primed.

9. The method of claim 1, wherein the step of declaring a fault state comprises displaying via a graphical interface a visual indication that a fault state is present.

10. The method of claim 1, further comprising:
automatically shutting off the heat exchanger.

11. The method of claim 1, further comprising:
shutting off equipment that rely on the heat exchanger to function properly.

12. A system for detecting an abnormal operating condition of a heat exchanger, the system comprising:
a heat exchanger;
a drive circuit configured to supply power to the heat exchanger, wherein the drive circuit comprises a current measuring device configured to measure current through the heat exchanger;
a processor configured to:
determine an actual current through the heat exchanger,
normalize the actual current;
determine a baseline current;
compare the baseline current to the actual current;
determine that the normalized actual current is less than the baseline current;
determine a baseline signal-to-noise ratio:
calculate an actual signal-to-noise ratio;
compare the actual signal-to-noise ratio to the baseline signal-to-noise ratio;
determine that the actual signal-to-noise ratio is greater than the baseline signal-to-noise ratio;
declare a fault state; and
a graphical display configured to display an indication that a fault state is declared.

13. The system of claim 12, wherein the current measuring device is a sense resistor.

14. A system for detecting an abnormal operating condition of a heat exchanger, the system comprising:
a heat exchanger:
a drive circuit configured to supply power to the heat exchanger, wherein the drive circuit comprises a current measuring device configured to measure current through the heat exchanger;
a processor configured to:
determine an actual current through the heat exchanger,
determine a baseline temperature;
determine a reference-temperature resistance of the heat exchanger and a thermal coefficient of electrical resistance of the heat exchanger;
calculate an actual temperature of the heat exchanger using the actual current, the reference-temperature resistance of the heat exchanger, and the thermal coefficient of electrical resistance of the heat exchanger for the step of using the actual current to indicate an abnormal operating condition comprises;
determine that the actual temperature of the heat exchanger is greater than the baseline temperature; and
declare a fault state, and
a graphical display configured to display an indication that a fault state is declared.

15. The system of claim 14, wherein the step of determining a reference-temperature resistance of the heat exchanger and a thermal coefficient of electrical resistance of the heat exchanger further configures the processor to:
operate the heat exchanger under a plurality of duty conditions;
measure a current and temperature for each of the plurality of duty conditions; and
calculate the reference-temperature resistance of the heat exchanger and the thermal coefficient of electrical resistance of the heat exchanger using the measured currents and temperatures.

16. A computer program product configured to detect a fault state of a heat exchanger, the computer program product comprising a computer readable storage medium having program instructions embodied therewith, the program instructions executable by a processor to cause the processor to:
operate a heat exchanger;
determine a baseline temperature;
determine a reference-temperature resistance of the heat exchanger and a thermal coefficient of electrical resistance of the heat exchanger;
determine an actual current through the heat exchanger;
calculate an actual temperature of the heat exchanger using the actual current, the reference-temperature resistance of the heat exchanger, and the thermal coefficient of electrical resistance of the heat exchanger;

determine that the actual temperature of the heat exchanger is greater than the baseline temperature;

declare a fault state; and display an indication that a fault state is declared.

17. A computer program product configured to detect a fault state of a heat exchanger, the computer program product comprising a computer readable storage medium having program instructions embodied therewith, the program instructions executable by a processor to cause the processor to:

operate a heat exchanger;

determine an actual current through the heat exchanger;

normalize the actual current;

determine a baseline current;

compare the baseline current to the actual current;

determine that the normalized actual current is less than the baseline current;

determine a baseline signal-to-noise ratio;

calculate an actual signal-to-noise ratio;

compare the actual signal-to-noise ratio to the baseline signal-to-noise ratio;

determine that the actual signal-to-noise ratio is greater than the baseline signal-to-noise ratio;

declare a fault state; and display an indication that a fault state is declared.

* * * * *